United States Patent
Mukherjee et al.

(10) Patent No.: US 6,850,487 B2
(45) Date of Patent: Feb. 1, 2005

(54) METHOD AND APPARATUS FOR GUARANTEEING A FAILURE-RECOVERY TIME IN A WAVELENGTH-DIVISION MULTIPLEXING NETWORK

(75) Inventors: Biswanath Mukherjee, Davis, CA (US); Keyao Zhu, Davis, CA (US); Laxman Sahasrabuddhe, San Ramon, CA (US)

(73) Assignee: The Regents of the University of California, Oakland, CA (US)

( * ) Notice: Subject to any disclaimer, the term of this patent is extended or adjusted under 35 U.S.C. 154(b) by 223 days.

(21) Appl. No.: 10/310,421

(22) Filed: Dec. 5, 2002

(65) Prior Publication Data

US 2004/0111651 A1 Jun. 10, 2004

(51) Int. Cl.[7] .............................................. G01R 31/08
(52) U.S. Cl. ...................................... 370/225; 370/244
(58) Field of Search ................................ 370/216–230, 370/241–252, 351–3, 389, 395.1, 400–406; 714/2, 7, 15

(56) References Cited

U.S. PATENT DOCUMENTS

| | | | | |
|---|---|---|---|---|
| 5,146,452 A | * | 9/1992 | Pekarske | 370/228 |
| 5,978,354 A | * | 11/1999 | Taketomi et al. | 370/226 |
| 6,625,115 B1 | * | 9/2003 | Ikeda et al. | 370/217 |
| 2003/0021222 A1 | * | 1/2003 | Boer et al. | 370/216 |
| 2003/0216141 A1 | * | 11/2003 | Antoniou et al. | 455/450 |
| 2003/0229807 A1 | * | 12/2003 | Qiao et al. | 713/200 |

* cited by examiner

Primary Examiner—David Vincent
(74) Attorney, Agent, or Firm—Park, Vaughan & Fleming, LLP

(57) ABSTRACT

One embodiment of the present invention provides a system that guarantees a stated failure-recovery time in an optical wavelength-division multiplexing (WDM) network. The system operates by first receiving a request at an ingress node of the WDM network to establish a connection from a source to a destination through the WDM network, wherein the request includes the stated failure-recovery time. The system then calculates a chain of restorable cycles within the WDM network between the ingress node for the source and an egress node for the destination, wherein each cycle in the chain of restorable cycles can guarantee the stated failure-recovery time. Finally, the system selects a section of each restorable cycle to be a primary path between the source and the destination through the restorable cycle.

24 Claims, 6 Drawing Sheets

METHOD AND APPARATUS FOR GUARANTEEING A FAILURE-RECOVERY TIME IN A WAVELENGTH-DIVISION MULTIPLEXING NETWORK

GOVERNMENT LICENSE RIGHTS

This invention was made with United States Government support under Grant or Contract Number ANI-98-05285, awarded by the National Science Foundation. The United States Government has certain rights in the invention.

BACKGROUND

1. Field of the Invention

The present invention relates to optical wavelength-division multiplexing (WDM) networks. More specifically, the present invention relates to a method and an apparatus for guaranteeing a stated failure-recovery time in an optical WDM network.

2. Related Art

Wavelength-division multiplexing (WDM) technology enables an optical fiber to support over one hundred wavelength channels, each of which can operate at a bandwidth of several gigabits per second (Gbps). A failure in such an optical network, e.g., a fiber cut or fiber conduit cut, can lead to the loss of a huge amount of data (several terabits per second (Tbps) to several petabits per second (Pbps)). Therefore, efficient fault-management schemes are extremely important for WDM optical networks to recover from such network failures. Being able to guarantee a maximum failure-recovery time is an extremely critical issue for the network operator in order to minimize the loss of data (and revenue) caused by the failure.

In a conventional network that supports voice traffic, a network failure needs to be recovered within 50 ms. This is due to the persistence of hearing of the human ear. If the failure is recovered within 50 ms, voice users will not notice any serious interruption during their conversation. Because existing networks were developed to support voice traffic, the failure-recovery time of 50 ms is presently a well-established standard.

Today's networks are mainly constructed as synchronous optical network/WDM (SONET/WDM) interconnected-ring-topology networks. SONET networks provide a self-healing mechanism, in which automatic protection switching (APS) is used to protect the traffic. By limiting the size of rings in a SONET network, APS can be used to recover a network failure within 50 ms.

In a SONET/WDM ring, 100% spare capacity is pre-reserved to provide protection capacity. However, this is a very inefficient strategy since bandwidth is a precious resource. As optical networks evolve from interconnected-ring topologies to arbitrary-mesh topologies, the optical cross-connects (OXCs) are expected to be mesh-enabled. Hence, they should be able to provide efficient and reliable protection schemes to replace APS in SONET ring networks.

Currently, many systems vendors and network operators consider end-to-end path protection to be the main protection scheme to be used in WDM mesh networks. In end-to-end path protection, a pair of link-disjoint paths is found for a connection request: one for the primary (working) path, and the other for backup (protection) path.

In WDM mesh protection, the failure-recovery time is determined by three main factors:

failure detection time (FDT): the time needed for the nodes around the failure point to detect the failure;

failure notification time (FNT): the time needed to notify the source node of the connection that a failure has occurred;

restoration time (RT): the time needed for dynamic discovery of backup resources; and protection switching and re-signaling time (PST): the time needed to activate the backup path, and to switch the traffic from the primary path to the backup path.

Due to current technology limitations (message processing time, OXC switching time, etc.) and physical constraints (e.g., the fiber propagation delay imposed by the speed of light), it is difficult to guarantee a specific failure-recovery time in WDM mesh networks, especially when the requirement is in the millisecond scale. While a 50 ms failure-recovery time is acceptable for voice transmission, much data can be lost in that amount of time. Hence, many users of WDM networks desire shorter failure-recovery times and are willing to pay a premium for the service, while other users are willing to accept longer failure-recovery times for a reduced fee.

Hence, what is needed is a method and an apparatus for guaranteeing a stated failure-recovery time in a WDM mesh network.

SUMMARY

One embodiment of the present invention provides a system that guarantees a stated failure-recovery time in an optical wavelength-division multiplexing (WDM) network. The system operates by first receiving a request at an ingress node of the WDM network to establish a connection from a source to a destination through the WDM network, wherein the request includes the stated failure-recovery time. The system then calculates a chain of restorable cycles within the WDM network between the ingress node for the source and an egress node for the destination, wherein each cycle in the chain of restorable cycles can guarantee the stated failure-recovery time. Finally, the system selects a section of each restorable cycle to be a primary path between the source and the destination through the restorable cycle.

In a variation of this embodiment, the system detects a failure on the primary path within the restorable cycle at either end of a link on the primary path.

In a further variation, the system notifies a preceding junction node within the restorable cycle that the failure has occurred. This preceding junction node is an entry node of the restorable cycle that also belongs to a preceding restorable cycle (or is the ingress node).

In a further variation, when the failure is detected, the system reroutes the signal flow through a backup path of the restorable cycle.

In a further variation, calculating the chain of restorable cycles on the WDM network involves locating a cycle of links within the WDM network that comprises a single restorable cycle. In doing so, the system ensures that the sum of failure detection time, failure notification time and failure-recovery time for this single restorable cycle does not exceed the stated failure-recovery time.

In a further variation, the WDM network can be dynamically configured to accommodate different stated failure-recovery times for different users/connections simultaneously using the same network.

In a further variation, the system uses the shortest section of each restorable cycle as the primary path between the source and the destination through the restorable cycle.

In a further variation, the system uses the longest section of each restorable cycle as a backup path between the source and the destination through the restorable cycle.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Single Restorable Cycle

Figure 1:
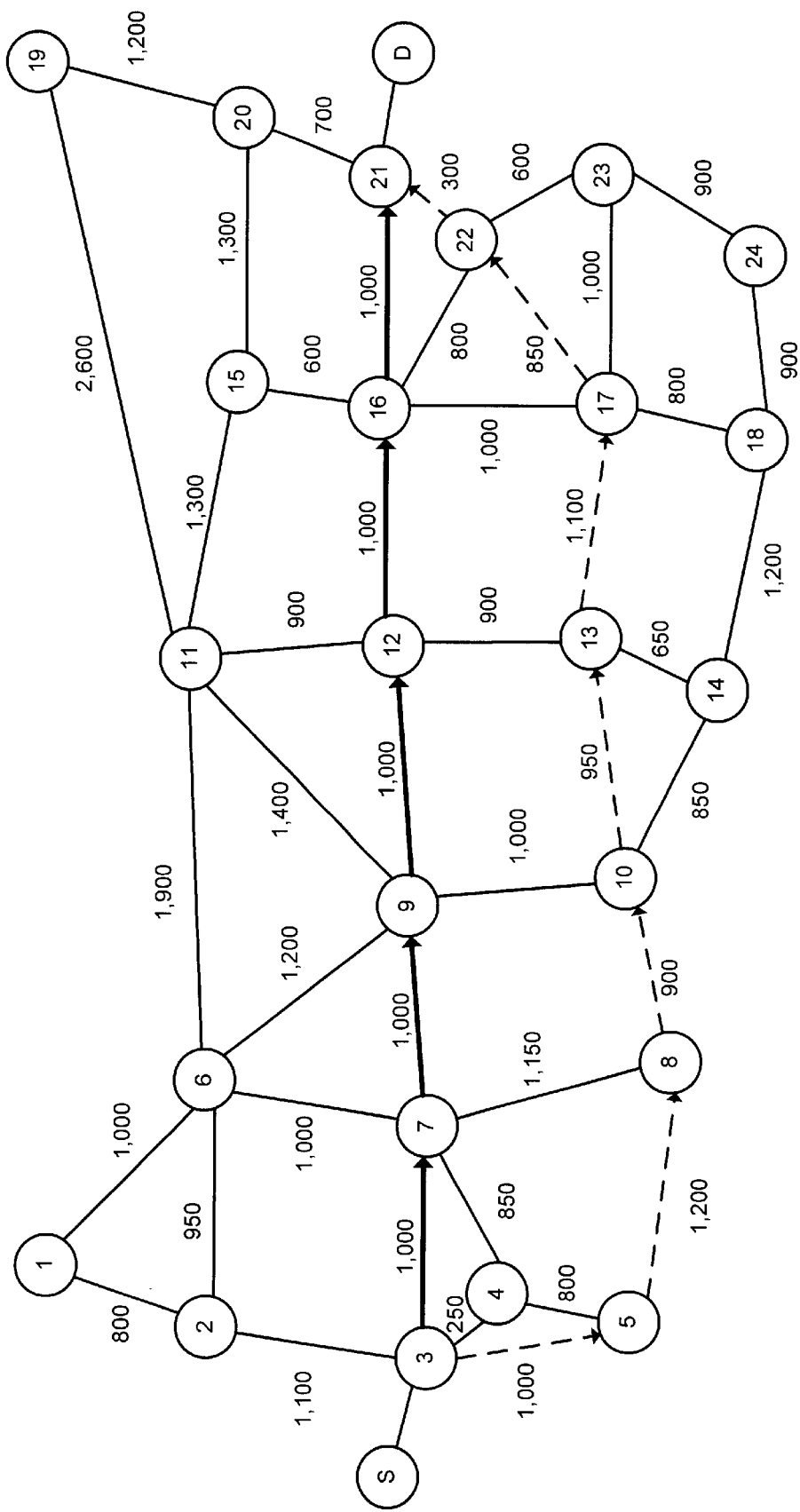
FIG. 1 illustrates a primary path and a backup path, which form a single restorable cycle within a WDM network in accordance with an embodiment of the present invention.

FIG. 1 illustrates a primary path and a backup path, which form a single restorable cycle within a WDM network in accordance with an embodiment of the present invention. The WDM network illustrated in FIG. 1 includes nodes 1 through 24, which are coupled together as illustrated by lines in FIG. 1. Each connection includes a distance, such as the 800 Km between nodes 1 and 2.

Also illustrated in FIG. 1 is source node, S, and destination node, D. Node S is coupled to the WDM network through an ingress node 3, while node D coupled to the WDM network through an egress node 21. Although the following discussion describes unidirectional traffic between the ingress node and the egress node, in general this traffic can be bi-directional.

When S requests a connection to D, the system establishes a primary path and a backup path for the connection. Note that the ingress node can establish these paths, or alternatively, the task of establishing these paths can be distributed across other nodes in the WDM network. The process of establishing such paths between nodes in a network is well-known in the art and will not be described further herein.

As illustrated by solid arrows in FIG. 1, a primary path, including nodes 3, 7, 9, 12, 16, and 21 has been established between ingress node 3 and egress node 21. Additionally, a backup path including nodes 3, 5, 8, 10, 13, 17, 22, and 21 has been established between ingress node 3 and egress node 21. The length of the primary path is 5,000 Km and the length of the backup path is 6,300 Km. This means the total length of the restorable cycle is 11,300 Km.

Failure on the Primary Path

Figure 2:
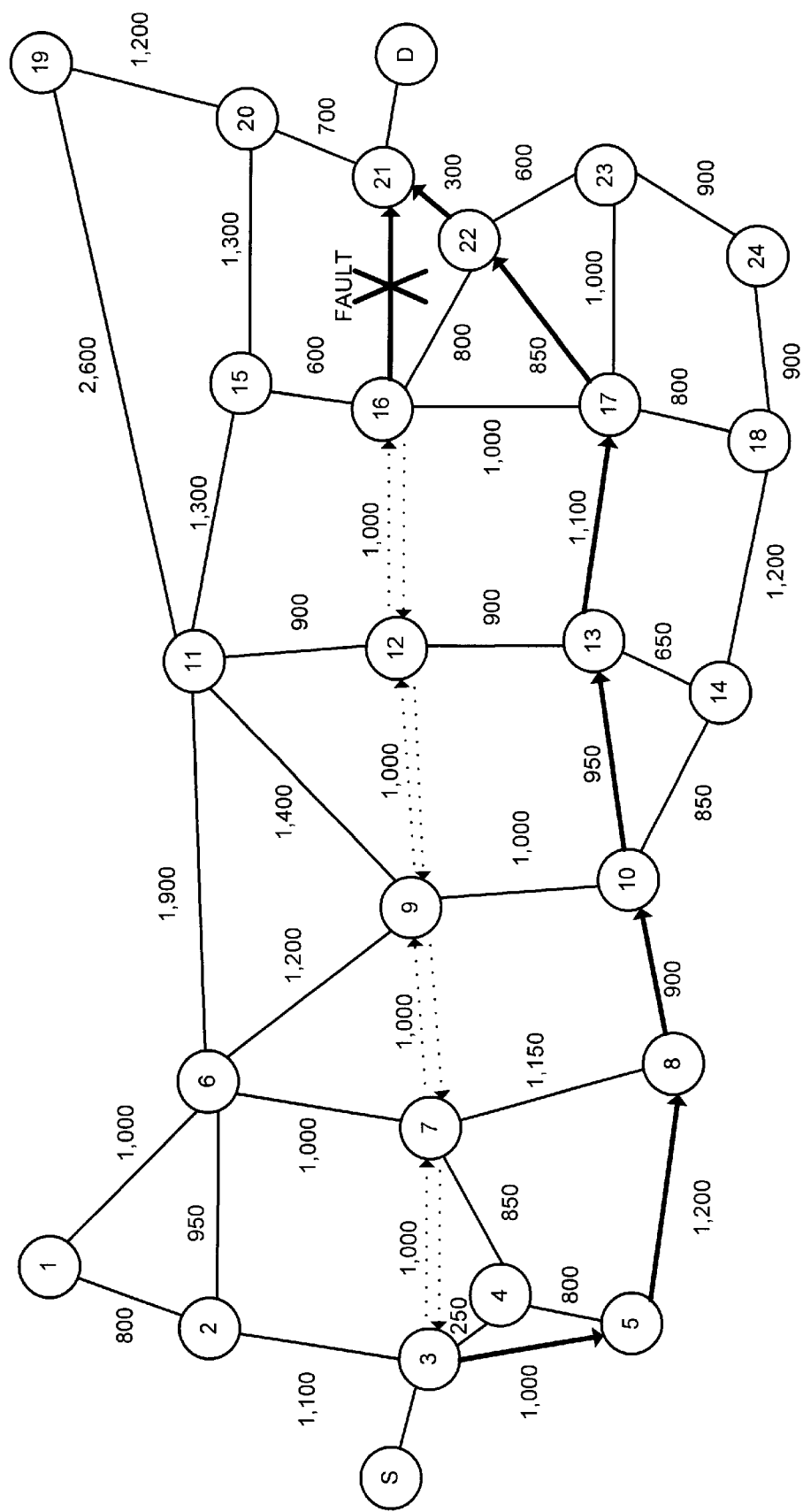
FIG. 2 illustrates recovery from a failure on a primary path within a WDM network in accordance with an embodiment of the present invention.

FIG. 2 illustrates recovery from a failure on a primary path of a WDM network in accordance with an embodiment of the present invention. As is illustrated in FIG. 2, first a failure occurs between nodes 16 and 21 on the primary path. The time it takes for nodes 16 and 21 to detect the failure (referred to as the failure detection time (FDT)) is 20 ms in some technologies. Note that the failure detection time may be different in other technologies. Note also that a failure can occur at a node rather than between nodes as shown.

Next, the first node of the restorable cycle (node 3) is notified of the failure. It takes a significant amount of time for the notification signal to be passed back from node 16 through nodes 12, 9, 7 to node 3. This amount of time is referred to as the "failure notification time (FNT)." Note that the total distance that the failure notification signal has to traverse is 4,000 Km. Given that the speed of light in the WDM network is 0.005 ms/Km, the FNT is 0.005*4000=20 ms. Note that this calculation does not include processing or computation time at a node.

Once the restored signal is re-routed to the backup path, the restored signal must reach node 21. The distance along the backup path is 6,300 Km as stated above. Therefore, the time for the restored signal to reach node 21 on the backup path is 0.005*6300=31.5 ms. Hence, the total recovery time is 20 ms+20 ms+31.5 ms=71.5 ms.

Note that this restorable cycle can meet a stated failure-recovery time of 71.5 ms or greater. As stated above, some users may be willing to accept this failure-recovery time, while others may not.

Multiple Restorable Cycles

Figure 3:
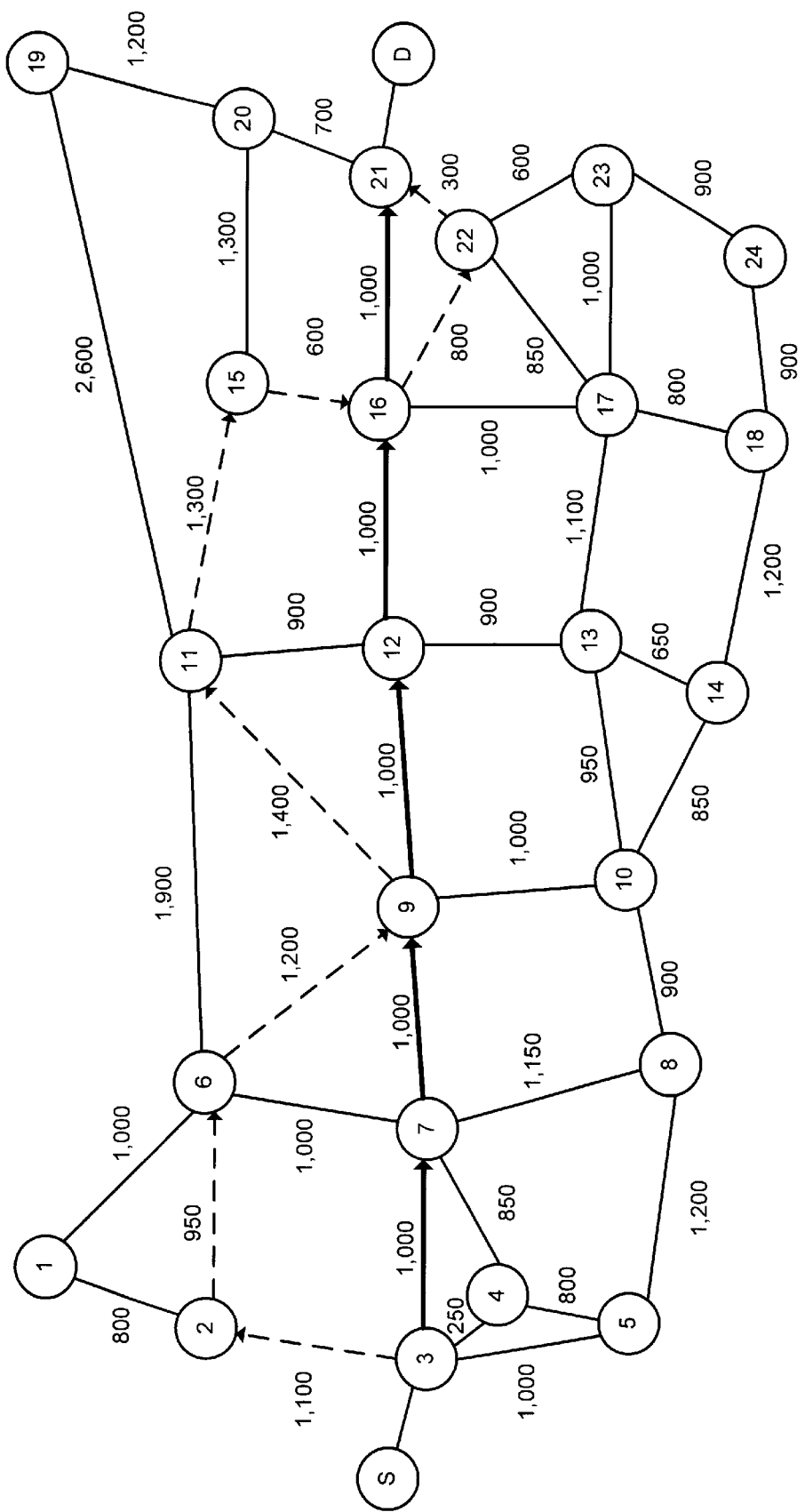
FIG. 3 illustrates a primary path and multiple restorable cycles within a WDM network in accordance with an embodiment of the present invention.

FIG. 3 illustrates a primary path and multiple restorable cycles on a WDM network in accordance with an embodiment of the present invention. As illustrated in FIG. 3, the WDM network contains three restorable cycles providing the primary and backup paths between ingress node 3 and egress node 21. The primary path between node 3 and node 21 includes nodes 3, 7, 9, 12, 16, and 21.

There are three restorable cycles along this primary path. Nodes 3, 7, 9, 2, and 6 form the first restorable cycle; nodes 9, 12, 16, 11, and 15 form the second restorable cycle; and nodes 16, 21, and 22 form the third restorable cycle.

When a failure occurs on a primary path through a restorable cycle, traffic is diverted to a backup path for the restorable cycle. For example, a failure between nodes 3 and 9 in the first restorable cycle causes traffic between nodes 3 and 9 to be re-routed through a backup path through nodes 2 and 6. Similarly, a failure between nodes 9 and 16 in the second restorable cycle causes traffic between nodes 9 and 16 to be re-routed through a backup path through nodes 11 and 15. Finally, a failure between nodes 16 and 21 in the third restorable cycle causes traffic between nodes 16 and 21 to be re-routed through a backup path through node 22.

Failure in a Restorable Cycle

Figure 4:
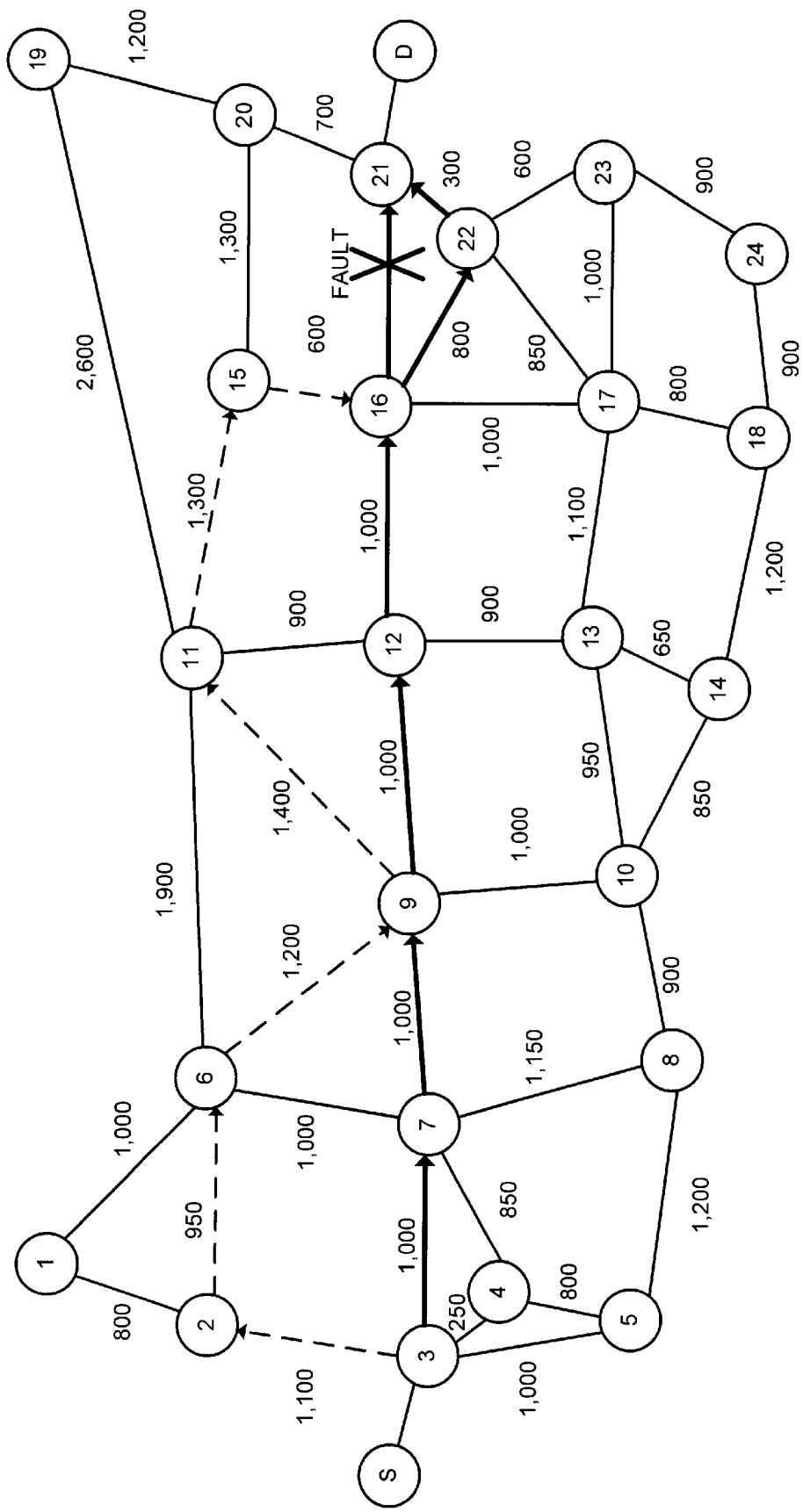
FIG. 4 illustrates recovery from a failure on a primary path within a WDM network in accordance with an embodiment of the present invention.

FIG. 4 illustrates an example of the process of recovering from a failure on a primary path within a WDM network in accordance with an embodiment of the present invention. As illustrated in FIG. 4, a failure has occurred between nodes 16 and 21 on the primary path. The time it takes for nodes 16 and 21 to detect the failure (the FDT) is 20 ms. (Note that 20 ms may not be typical for a given architecture and can include the processing time at the node.) Moreover, the first node of the restorable cycle, node 16 is immediately aware of the failure. Hence, the FNT is zero ms. Since the distance on the backup path is 1,100 Km as stated above, the time for the restored signal to reach node 21 on the backup path is 0.005*1100=5.5 ms. Hence, the total recovery time is 20+0+5.5=25.5 ms.

Failure in a Different Restorable Cycle

Figure 5:
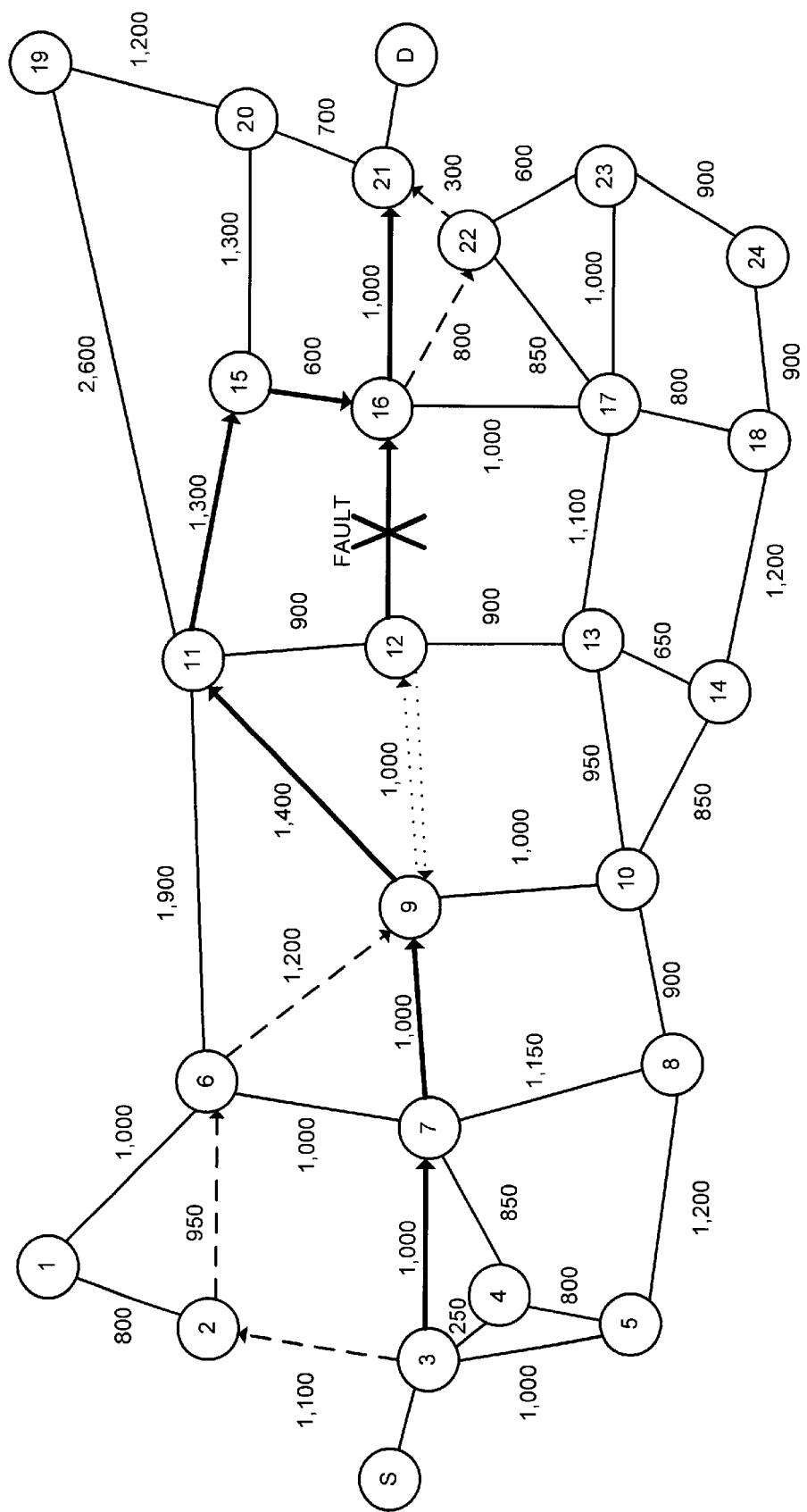
FIG. 5 illustrates recovery from a failure on a primary path within a WDM network in accordance with an embodiment of the present invention.

FIG. 5 illustrates the process of recovering from another failure on a primary path within the WDM network in accordance with an embodiment of the present invention. As illustrated in FIG. 5, a failure occurs between nodes 12 and 16 on the primary path. The time it takes for nodes 12 and 16 to detect the failure (the FDT) is 20 ms. Next, the first node of the restorable cycle (node 9) is notified of the failure. The total distance from node 12 to node 9 is 1,000 Km, and the speed of light through the WDM network, 0.005 ms/Km. Hence, the FNT is 0.005*1000=5 ms. The distance on the backup path through nodes 11 and 15 is 3,300 Km. Therefore, the time is takes for the restored signal to reach node 21 on the backup path is 0.005*3300=16.5 ms. Hence, the total recovery time is 20+5+16.5=41.5 ms.

Note that the maximum failure-recovery times for the three restorable cycles shown in FIGS. 3–5 are 41.25 ms, 41.5 ms, and 25.5 ms, respectively. These restorable cycles, therefore, can meet a stated failure-recovery time of 41.5 ms or greater. Other combinations of restorable cycles can be formed to meet shorter stated failure-recovery times. As stated above, some users may be willing to pay more for a failure-recovery time better than the standard 50 ms.

Creating Restorable Cycles

Figure 6:
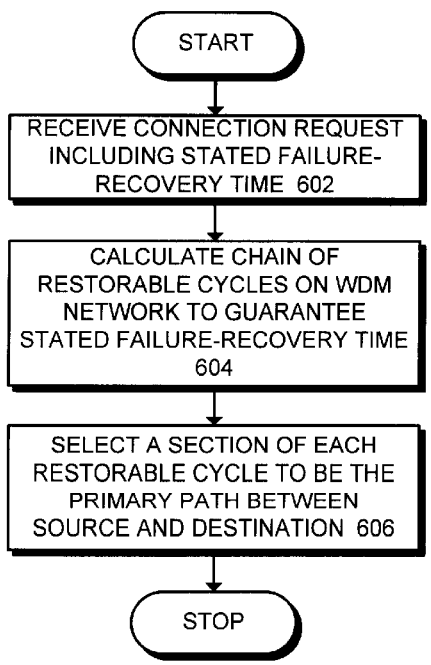
FIG. 6 is a flowchart illustrating the process of creating restorable cycles on a WDM network in accordance with an embodiment of the present invention.

FIG. 6 is a flowchart illustrating the process of creating restorable cycles within a WDM network in accordance with an embodiment of the present invention. The system starts when the system receives a connection request to connect a source to a destination (step 602). This connection request includes a stated failure-recovery time. Next, the system calculates a chain of restorable cycles within the WDM network that guarantee the stated failure-recovery time (step 604). This calculation involves repeatedly selecting a link or series of links for a primary path, and then attempting to find a link or a series of links to form a backup path, which guarantees the stated failure-recovery time. Finally, the system selects a section of each restorable cycle as the primary path between the source and destination (step 606). Note that this selected section of the restorable cycle is typically the shortest section of the restorable cycle between the source and destination.

Failure Recovery

Figure 7:
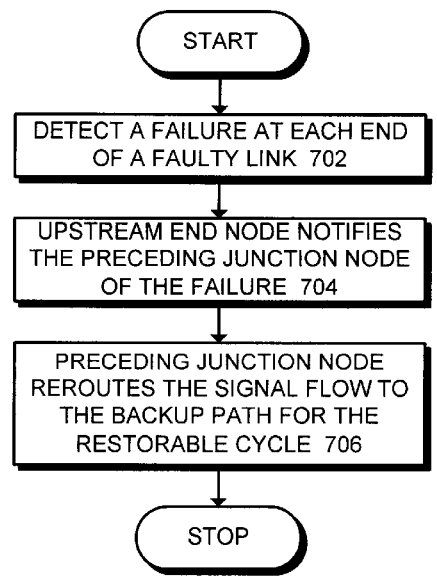
FIG. 7 is a flowchart illustrating the process of recovering from a failure on a WDM network in accordance with an embodiment of the present invention.

FIG. 7 is a flowchart illustrating the process of recovering from a failure within a WDM network in accordance with an embodiment of the present invention. The system starts when a node on the WDM network detects a failure at either end of a link (step 702). Next, the upstream node that detects the failure notifies the preceding junction node of the failure (step 704). This preceding junction node is an upstream node that forms a junction between the restorable cycle with the failure and an upstream restorable cycle. Finally, the preceding junction node re-routes the signal flow to the backup path of the restorable cycle (step 706).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for guaranteeing a stated failure-recovery time in a wavelength-division multiplexing (WDM) network, comprising:

receiving a request at an ingress node of the WDM network to establish a connection from a source to a destination through the WDM network, wherein the request includes the stated failure-recovery time;

calculating a chain of restorable cycles within the WDM network between the ingress node associated with the source and an egress node associated with the destination, wherein each cycle in the chain of restorable cycles can guarantee the stated failure-recovery time; and selecting a section of each restorable cycle to be a primary path between the source and the destination through the restorable cycle.

2. The method of claim 1, further comprising detecting a failure on the primary path within the restorable cycle, wherein the failure is detected at either end of a link.

3. The method of claim 2, further comprising notifying a preceding junction node within the restorable cycle that the failure has occurred, wherein the preceding junction node is an entry node of the restorable cycle.

4. The method of claim 3, further comprising rerouting a signal flow to a backup path of the restorable cycle when the failure is detected.

5. The method of claim 1, wherein calculating the chain of restorable cycles on the WDM network involves locating a cycle of links within the WDM network that comprises a single restorable cycle, wherein a sum of failure detection time, failure notification time and failure-recovery time for the single restorable cycle does not exceed the stated failure-recovery time.

6. The method of claim 1, wherein the WDM network can be dynamically configured to accommodate different stated failure-recovery times for different users/connections.

7. The method of claim 1, further comprising using a shortest section of each restorable cycle as the primary path between the source and the destination through the restorable cycle.

8. The method of claim 1, further comprising using a longest section of each restorable cycle as a backup path between the source and the destination through the restorable cycle.

9. A computer-readable storage medium storing instructions that when executed by a computer cause the computer to perform a method for guaranteeing a stated failure-recovery time in a wavelength-division multiplexing (WDM) network, the method comprising:

receiving a request at an ingress node of the WDM network to establish a connection from a source to a destination through the WDM network, wherein the request includes the stated failure-recovery time;

calculating a chain of restorable cycles within the WDM network between the ingress node associated with the source and an egress node associated with the destination, wherein each cycle in the chain of restorable cycles can guarantee the stated failure-recovery time; and selecting a section of each restorable cycle to be a primary path between the source and the destination through the restorable cycle.

10. The computer-readable storage medium of claim 9, the method further comprising detecting a failure on the primary path within the restorable cycle, wherein the failure is detected at either end of a link.

11. The computer-readable storage medium of claim 10, the method further comprising notifying a preceding junction node within the restorable cycle that the failure has occurred, wherein the preceding junction node is an entry node of the restorable cycle.

12. The computer-readable storage medium of claim 11, the method further comprising rerouting a signal flow to a backup path of the restorable cycle when the failure is detected.

13. The computer-readable storage medium of claim 9, wherein calculating the chain of restorable cycles on the WDM network involves locating a cycle of links within the WDM network that comprises a single restorable cycle, wherein a sum of failure detection time, failure notification time and failure-recovery time for the single restorable cycle does not exceed the stated failure-recovery time.

14. The computer-readable storage medium of claim 9, wherein the WDM network can be dynamically configured to accommodate different stated failure-recovery times for different users/connections.

15. The computer-readable storage medium of claim 9, the method further comprising using a shortest section of each restorable cycle as the primary path between the source and the destination through the restorable cycle.

16. The computer-readable storage medium of claim 9, the method using a longest section of each restorable cycle as a backup path between the source and the destination through the restorable cycle.

17. An apparatus for guaranteeing a stated failure-recovery time in a wavelength-division multiplexing (WDM) network, comprising:

a receiving mechanism configured to receive a request at an ingress node of the WDM network to establish a connection from a source to a destination through the WDM network, wherein the request includes the stated failure-recovery time;

a calculating mechanism configured to calculate a chain of restorable cycles within the WDM network between the ingress node associated with the source and an egress node associated with the destination, wherein each cycle in the chain of restorable cycles can guarantee the stated failure-recovery time; and a selecting mechanism configured to select a section of each restorable cycle to be a primary path between the source and the destination through the restorable cycle.

18. The apparatus of claim 17, further comprising a detecting mechanism configured to detect a failure on the primary path within the restorable cycle, wherein the failure is detected at either end of a link.

19. The apparatus of claim 18, further comprising a notifying mechanism configured to notify a preceding junction node within the restorable cycle that the failure has occurred, wherein the preceding junction node is an entry node of the restorable cycle.

20. The apparatus of claim 19, further comprising a rerouting mechanism configured to reroute a signal flow to a backup path of the restorable cycle when the failure is detected.

21. The apparatus of claim 17, wherein the calculating mechanism includes a locating mechanism configured to locate a cycle of links within the WDM network that comprises a single restorable cycle, wherein a sum of failure detection time, failure notification time and failure-recovery time for the single restorable cycle does not exceed the stated failure-recovery time.

22. The apparatus of claim 17, wherein the WDM network can be dynamically configured to accommodate different stated failure-recovery times for different users/connections.

23. The apparatus of claim 17, wherein the restorable cycle using mechanism is further configured to use a shortest section of each restorable cycle as the primary path between the source and the destination through the restorable cycle.

24. The apparatus of claim 17, wherein the restorable cycle using mechanism is further configured to use using a longest section of each restorable cycle as a backup path between the source and the destination through the restorable cycle.

* * * * *